United States Patent
Mochizuki (10) Patent No.: US 10,649,322 B2
(45) Date of Patent: May 12, 2020

(54) OPTICAL WHEEL DEVICE, LIGHT SOURCE UNIT, AND PROJECTOR

(71) Applicant: CASIO COMPUTER CO., LTD., Tokyo (JP)

(72) Inventor: Hidehiko Mochizuki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/424,864

(22) Filed: May 29, 2019

(65) Prior Publication Data

US 2019/0369471 A1    Dec. 5, 2019

(30) Foreign Application Priority Data

May 29, 2018 (JP) .................................. 2018-102304

(51) Int. Cl.
*G03B 21/20* (2006.01)
*G03B 21/16* (2006.01)
*G03B 33/08* (2006.01)

(52) U.S. Cl.
CPC .......... *G03B 21/204* (2013.01); *G03B 21/16* (2013.01); *G03B 33/08* (2013.01)

(58) Field of Classification Search
CPC ...... G03B 21/204; G03B 21/16; G03B 21/14; G03B 33/08; H04N 9/31; H04N 9/3114; H04N 9/3117

USPC .......................................................... 353/84
See application file for complete search history.

(56) References Cited

U.S. PATENT DOCUMENTS

| 10,003,775 B2 * | 6/2018 | Miyazaki ............. H04N 9/3111 |
| 2010/0245776 A1 * | 9/2010 | Yamamoto ........... G03B 21/204 353/38 |

FOREIGN PATENT DOCUMENTS

| JP | 2016-057396 A | 4/2016 |
| JP | 2017-003681 A | 1/2017 |
| JP | 2017-116629 A | 6/2017 |
| JP | 2017-173798 A | 9/2017 |
| JP | 2017-191280 A | 10/2017 |

* cited by examiner

*Primary Examiner* — William C. Dowling
(74) *Attorney, Agent, or Firm* — Scully Scott Murphy & Presser (57) ABSTRACT

An optical wheel device according to the present invention includes a first wheel on one side of which a luminescent material layer is disposed, a second wheel disposed on the other side of the first wheel, a first opening portion provided on the first wheel or the second wheel to be situated near a center of rotation, a second opening portion provided further radially outwards than the first opening portion, a communication passage formed between the first wheel and the second wheel to establish a communication between the first opening portion and the second opening portion, a motor configured to rotationally drive the first wheel and the second wheel, and a drive control device configured to control driving of the motor.

20 Claims, 6 Drawing Sheets

OPTICAL WHEEL DEVICE, LIGHT SOURCE UNIT, AND PROJECTOR

CROSS-REFERENCE TO RELATED APPLICATION

This patent application is based upon and claims the benefit of priority under 35 USC 119 from Japanese Patent Application No. 2018-102304 filed on May 29, 2018, the entire disclosure of which, including the description, claims, drawings, and abstract, is incorporated herein by reference in its entirety.

BACKGROUND OF THE INVENTION

Field of the Invention

The present invention relates to an optical wheel device, a light source unit including this optical wheel device, and a projector including the light source unit.

Description of the Related Art

Data projectors are widely used on many occasions in these days as an image projector for projecting a screen of a personal computer, a video image, and further, an image based on image data recorded on a memory card or the like onto a screen. In these data projectors, light emitted from a light source is collected onto a micromirror display device called a digital micromirror device (DMD) or a liquid crystal panel to display a color image onto a screen.

Then, these data projectors, which are image projectors, have now a wide variety of applications from presentations on business scenes to home uses as video equipment such as personal computers, DVD players and the like have been propagated. Conventionally, in the mainstream of these projectors, high-intensity discharge lamps have been used as a light source. In recent years, however, various types of projectors have been developed which includes multiple semiconductor light emitting elements such as laser diodes for use as a light source and a luminescent plate that uses the semiconductor light emitting elements as an excitation light source.

Japanese Unexamined Patent Application No. 2017-191280 (hereinafter, referred to as JP-A-2017-191280) discloses a projector that includes an optical wheel (a rotational luminescent plate) including a wavelength changing element.

In the optical wheel (the rotational luminescent plate) disclosed in JP-A-2017-191280, the luminous efficiency is decreased as the temperature of a luminescent material layer (the wavelength changing element) is increased. Consequently, to increase the luminous efficiency of luminescent light, the temperature of the luminescent material layer needs to be decreased, and hence, a high cooling efficiency has been desired.

SUMMARY OF THE INVENTION

The present invention has been made in view of the situations described above, and an object of the present invention is to provide an optical wheel device with a luminescent material layer having high cooling efficiency, a light source unit including this optical wheel device, and a projector including this light source unit.

According to an aspect of the present invention, there is provided an optical wheel device including: a first wheel having a luminescent material layer disposed on one side thereof; a second wheel disposed on the other side of the first wheel; a first opening portion provided on the first wheel or the second wheel to be situated near a center of rotation; a second opening portion provided further radially outwards than the first opening portion; a communication passage formed between the first wheel and the second wheel to establish a communicated between the first opening portion and the second opening portion; a motor configured to rotationally drive the first wheel and the second wheel; and a drive control device configured to control driving of the motor.

According to another aspect of the present invention, there is provided a light source unit including the optical wheel device described above and an excitation light shining device including a semiconductor light emitting element configured to excite the luminescent material layer.

According to a further aspect of the invention, there is provided a projector including the light source unit described above, a display device on to which light source light is shone from the light source unit to form image light; a projection-side optical system configured to project the image light emitted from the display device on to a screen, and a projector control unit configured to control the display device and the light source unit.

DETAILED DESCRIPTION OF THE PREFERRED EMBODIMENT

Figure 1:
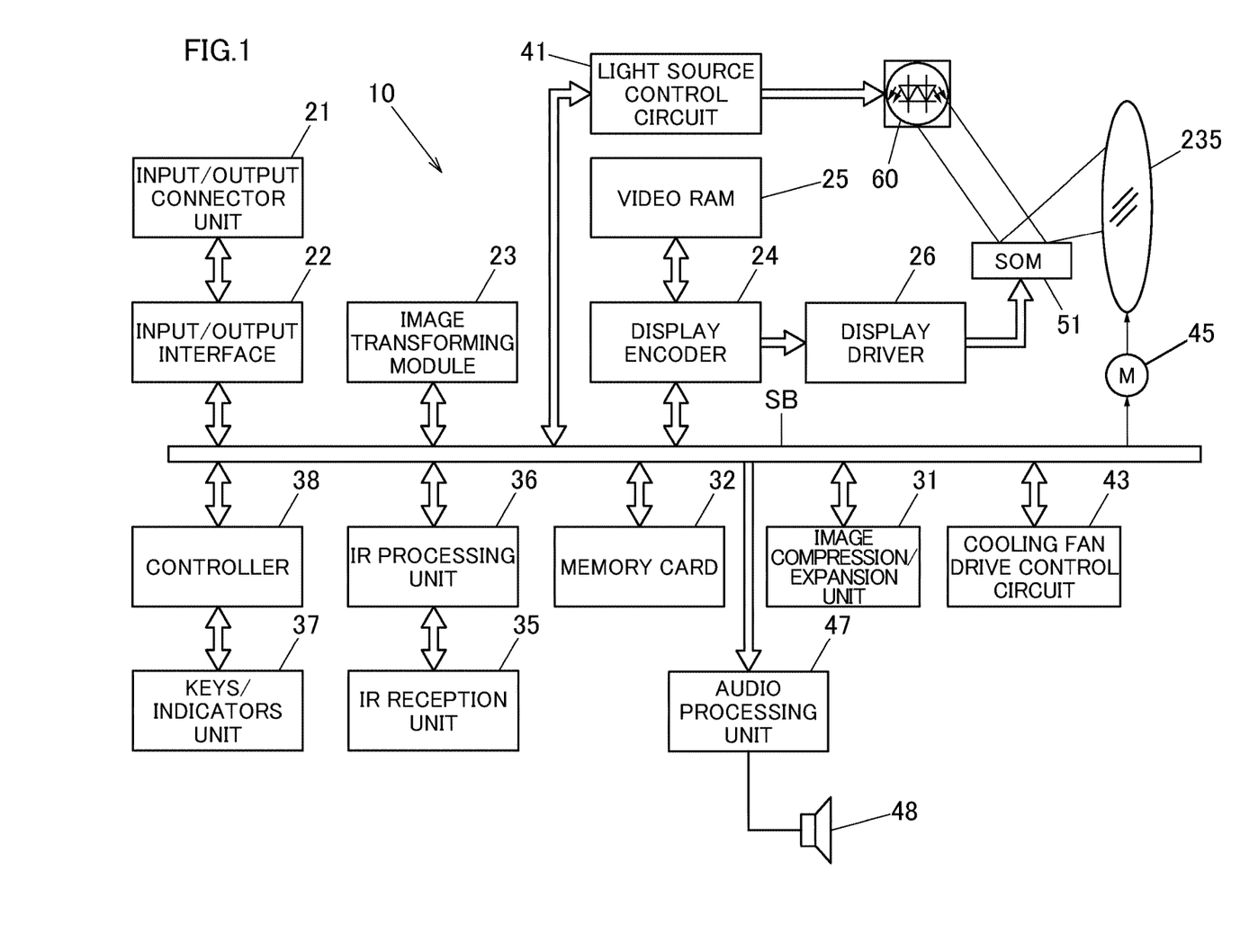
FIG. 1 is a block diagram illustrating functional blocks of a projector according to an embodiment of the present invention.

Hereinafter, an embodiment according to the present invention will be described based on drawings. FIG. 1 is a block diagram illustrating functional circuit blocks of a projector control unit of a projector 10. The projector control unit includes a controller 38, an input/output interface 22, an image transforming module 23, a display encoder 24, a display driver 26 and the like.

This controller 38 governs the control of operations of individual circuitries inside the projector 10 and includes CPU, ROM storing fixedly operation programs of various settings, RAM that is used as a work memory, and the like.

Then, the controller 38 sends image signals of various standards which are inputted from an input/output connector unit 21 via the input/output interface 22 and a system bus (SB) to the image transforming module 23, where the image signals are transformed so as to be unified into an image signal of a predetermined format which is suitable for display. Thereafter, the controller 38 outputs the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions a display device controller and drives a display device 51, which is a spatial optical modulator (SOM), at an appropriate frame rate corresponding to the image signal outputted from the display encoder 24.

Then, in the projector 10, pencils of light emitted from a light source unit 60 are shone onto the display device 51 by way of an optical system to form an optical image by reflecting light from the display device 51, and the image so formed is then projected onto a screen, not illustrated, for display by way of a projection-side optical system. A movable lens group 235 of the projection-side optical system is driven by a lens motor 45 for zooming and focusing.

An image compression/expansion unit 31 performs a recording process in which a luminance signal and a color difference signal of an image signal are data compressed through Adaptive Discrete Cosine Transform (ADCT) and Huffman coding processes, and the compressed data is sequentially written on a memory card 32, which constitutes a detachable recording medium.

Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

Then, operation signals from a keys/indicators unit 37 including main keys and indicators which are provided on a casing of the projector 10 are sent out directly to the controller 38. Key operation signals from a remote controller are received by an IR reception unit 35 and are then demodulated into a code signal at an IR processing unit 36 for output to the controller 38.

An audio processing unit 47 is connected to the controller 38 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which is configured as a light source control unit. The light source control circuit 41 controls individually a red light source device, a green light source device, and a blue light source device of the light source unit 60 so that light in predetermined wavelength ranges is emitted from the light source unit 60 so as to generate an image as required.

Further, the controller 38 causes a cooling fan drive control circuit 43 to detect temperatures through a plurality of temperature sensors which are provided in the light source unit 60 so as to control the revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
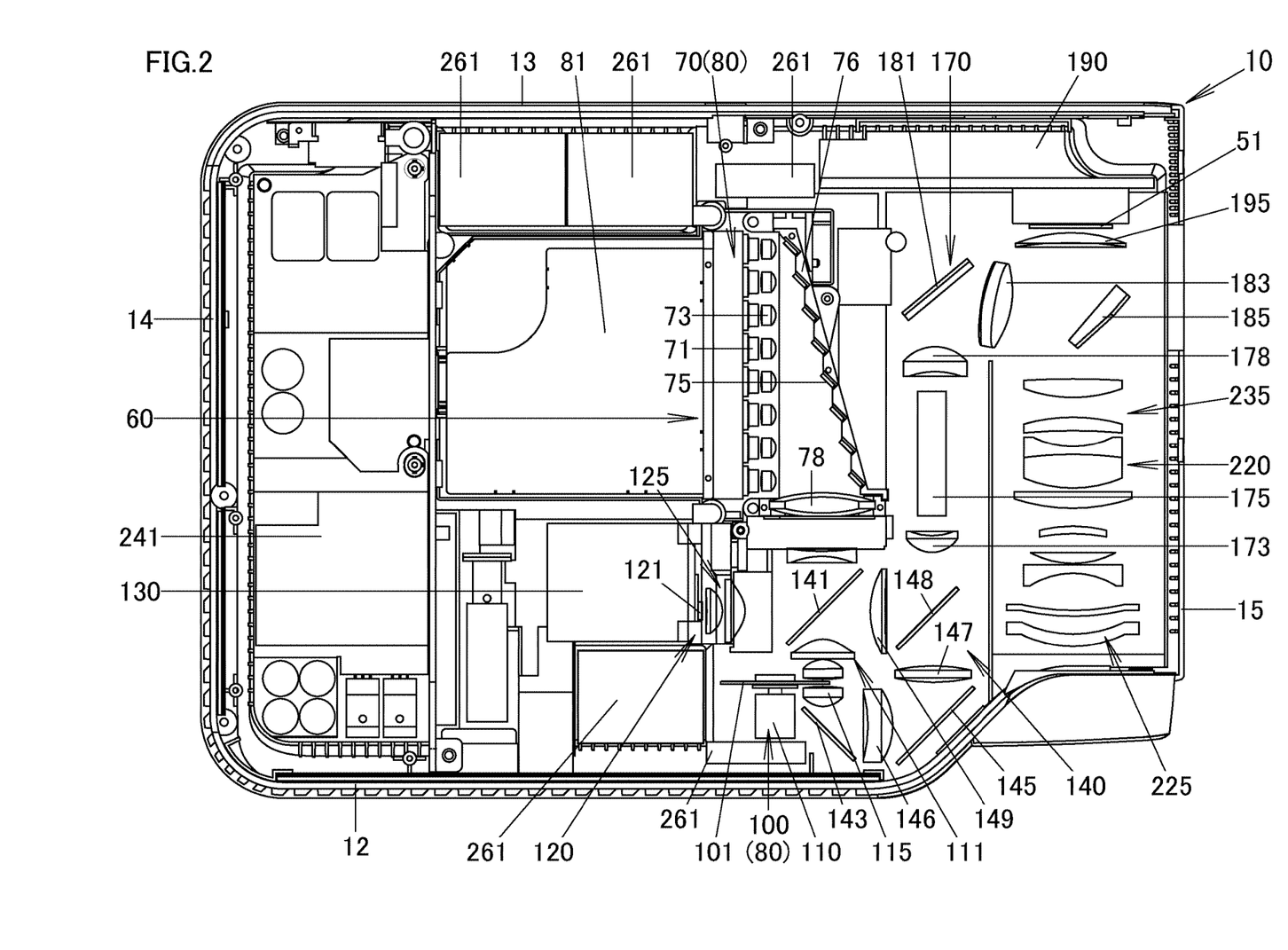
FIG. 2 is a schematic plan view illustrating an internal structure of the projector according to the embodiment of the present invention.

Next, an internal structure of the projector 10 will be described. FIG. 2 is a schematic plan view illustrating the internal structure of the projector 10. Here, the casing of the projector 10 has a substantially box-like shape and includes an upper and lower panels, a front panel 12, a rear panel 13, a right panel 14, and a left panel 15. In the following description, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 includes a control circuit board 241 near the right panel 14. This control circuit board 241 includes a power supply circuit block, a light source control block, and the like. Additionally, the projector 10 includes the light source unit 60 to a side of the control circuit board 241, that is, at a substantially central portion of the casing of the projector 10. Further, the projector 10 includes a light source-side optical system 170 and a projection-side optical system 220 that are disposed between the light source unit 60 and the left panel 15.

The light source unit 60 includes an excitation light shining device 70, which constitutes a light source of light having a wavelength in the blue wavelength range or, simply, light in the blue wavelength range and an excitation light source, a red light source device 120, which constitutes a light source of light having a wavelength in the red wavelength range or, simply, light in the red wavelength range, and a green light source device 80, which constitutes a light source of light having a wavelength in the green wavelength range or, simply, light in the green wavelength range. The green light source device 80 is made up of the excitation light shining device 70 and an optical wheel device 100. The light source unit 60 also includes a light-guiding optical system 140 configured to guide light in the blue wavelength range, light in the green wavelength range, and light in the red wavelength range. The light-guiding optical system 140 collects light beams in the blue, green and red wavelength ranges emitted from the blue, green and red light source devices 70, 80, 120, respectively, to an incident port of a light tunnel 175.

The excitation light shining device 70 is disposed at a substantially central portion of the casing of the projector 10 in relation to a left-and-right direction thereof and near the rear panel 13. The excitation light shining device 70 includes a light source group of blue laser diodes 71, a reflection mirror group 75, a collective lens 78, a heat sink 81, and the like. The light source group includes the blue laser diodes 71 which are a plurality of semiconductor light emitting elements. The blue laser diodes 71 are disposed so that their optical axes become parallel to the rear panel 13. The reflection mirror group 75 turns an axis of light emitted from each of the blue laser diodes 71 through 90 degrees in the direction of the front panel 12. The collective lens 78 collects light emitted from each of the blue laser diodes 71 and then reflected by the reflection mirror group 75. The heat sink 81 is disposed between the blue laser diodes 71 and the right panel 14.

In the light source group, the blue laser diodes 71, which are the plurality of semiconductor light emitting elements, are arranged into a matrix configuration. In addition, collimator lenses 73 are disposed individually on the optical axes of the blue laser diodes 71. The collimator lenses 73 transform light emitted from the blue laser diodes 71 into parallel light so as to enhance the directivity of the emitted light. In the reflection mirror group 75, a plurality of reflection mirrors are arranged into a step-like configuration and are integrated with a mirror substrate or base plate 76 while being adjusted in position. Thus, the reflection mirrors of the reflection mirror group 75 reduce sectional areas of pencils of light emitted from the blue laser diodes 71 in one direction to emit them to the collective lens 78.

A cooling fan 261 is disposed between the heat sink 81 and the rear panel 13. The blue laser diodes 71 are cooled by the cooling fan 261 and the heat sink 81. A cooling fan 261 is disposed further between the reflection mirror group 75 and the rear panel 13. This cooling fan 261 cools the reflection mirror group 75 and the collective lens 78.

The red light source device 120 includes a red light source 121 and a collective lens group 125. The red light source 121 is disposed so that its optical axis becomes parallel to the blue laser diodes 71. The collective lens group 125 collects light emitted from the red light source 121. The red light source 121 is a red light emitting diode which is a semiconductor light emitting element emitting light in the red wavelength range. The red light source device 120 is disposed so that an axis of light in the red wavelength range emitted from the red light source device 120 intersects an axis of light in the blue wavelength range emitted from the excitation light shining device 70 and an axis of light in the green wavelength range emitted from an optical wheel 101. The red light source device 120 includes further a heat sink 130 which is disposed on a side of the red light source 121 which faces the right panel 14. A cooling fan 261 is disposed between the heat sink 130 and the front panel 12. Thus, the red light source 121 is cooled by the cooling fan 261 and the heat sink 130.

The optical wheel device 100, which makes up the green light source device 80, is disposed on an optical path of excitation light emitted from the excitation light shining device 70 and near the front panel 12. The optical wheel device 100 includes the optical wheel 101, a motor 110, a drive control device, not illustrated, a collective lens group 111 and a collective lens 115. The optical wheel 101 is disposed so as to be parallel to the front panel 12, that is, so as to intersect an axis of light emitted from the excitation light shining device 70 at right angles. The motor 110 drives the optical wheel 101 rotationally. The drive control device controls the driving of the motor 110. The collective lens group 111 collects a pencil of excitation light emitted from the excitation light shining device 70 to the optical wheel 101 and also collects a pencil of light emitted from the optical wheel 101 in the direction of the rear panel 13. The collective lens 115 collects a pencil of light emitted from the optical wheel 101 in the direction of the front panel 12. The drive control device is controlled by the light source control circuit 41. A cooling fan 261 is disposed between the motor 110 and the front panel 12, so that the optical wheel 100 and the like are cooled by this cooling fan 261. The optical wheel 101 of the optical wheel device 100 will be described in detail later.

Then, the light guiding optical system 140 includes collective lenses configured to collect pencils of light in the red wavelength range, light in the green wavelength range and light in the blue wavelength range, and reflection mirrors and dichroic mirrors that are configured to turn axes of pencils of light in the red wavelength range, light in the green wavelength range, and light in the blue wavelength range so as to align them in the same direction, and the like. Specifically, the light guiding optical system 140 includes a first dichroic mirror 141, and this first dichroic mirror 141 is disposed in a position where light in the blue wavelength range emitted from the excitation light shining device 70 and light in the green wavelength range emitted from the optical wheel 101 intersect light in the red wavelength range emitted from the red light source device 120. The first dichroic mirror 141 transmits both light in the blue wavelength range and light in the red wavelength range and reflects light in the green wavelength range in such a manner as to turn an axis of light in the green wavelength range through 90 degrees in the direction of the left panel 15.

A first reflection mirror 143 is disposed on an axis of light in the blue wavelength range transmitted through the optical wheel 101 or transmitted therethrough while being diffused, that is, between the collective lens 115 and the front panel 12. The first reflection mirror 143 reflects light in the blue wavelength range in such a manner as to turn an axis thereof through 90 degrees in the direction of the left panel 15. A collective lens 146 is disposed on a side of the first reflection mirror 143 which faces the left panel 15. Further, a second reflection mirror 145 is disposed on a side of the collective lens 146 which faces the left panel 15. A collective lens 147 is disposed on a side of the second reflection mirror 145 which faces the rear panel 13. An axis of light in the blue wavelength range which is reflected by the first reflection mirror 143 to be incident on the second reflection mirror 145 by way of the collective lens 146 is turned through 90 degrees in the direction of the rear panel 13 by the second reflection mirror 145.

A collective lens 149 is disposed on a side of the first dichroic mirror 141 which faces the left panel 15. Further, a second dichroic mirror 148 is disposed on a side of the collective lens 149 which faces the left panel 15 and on a side of the collective lens 147 which faces the rear panel 13. The second dichroic mirror 148 reflects light in the red wavelength range and light in the green wavelength range in such a manner as to turn axes thereof through 90 degrees in the direction of the rear panel 13 and transmits light in the blue wavelength range.

Light in the red wavelength range transmitted through the first dichroic mirror 141 and light in the green wavelength range that is reflected by the first dichroic mirror 141 in such a manner that an axis thereof coincides with an axis of the light in the red wavelength range are incident on the collective lens 149. Then, the light in the red wavelength range and the light in the green wavelength range pass through the collective lens 149 and are reflected by the second dichroic mirror 148 to be collected to the incident port of the light tunnel 175 by way of a collective lens 173 of the light source-side optical system 170. On the other hand, light in the blue wavelength range that passes through the collective lens 147 passes through the second dichroic mirror 148 and is collected to the incident port of the light tunnel 175 by way of the collective lens 173.

The light source-side optical system 170 includes the collective lens 173, the light tunnel 175, a collective lens 178, a light axis turning mirror 181, a collective lens 183, a light shining mirror 185 and a condenser lens 195. The condenser lens 195 emits image light emitted from the display device 51, which is disposed on a side of the condenser lens 195 which faces the rear panel 13, towards the projection-side optical system 220, and therefore, the condenser lens 195 is also regarded as a part of the projection-side optical system 220.

The collective lens 173 is disposed near the light tunnel 175 and collects light source light to the incident port of the light tunnel 175. Thus, light in the red wavelength range, light in the green wavelength range and light in the blue wavelength range are collected by the collective lens 173 and are then incident on the light tunnel 175. The resulting pencil of light incident on the light tunnel 175 is then formed into a pencil of light whose intensity is distributed uniformly by the light tunnel 175.

The light axis turning mirror 181 is disposed on an optical axis of the light tunnel 175 away from an end of the light tunnel 175 which faces the rear panel 13 with the collective lens 178 interposed therebetween. The pencil of light emitted from an emerging port of the light tunnel 175 is collected by the collective lens 178, and thereafter, an axis of the pencil of light so collected is turned towards the left panel 15 by the light axis turning mirror 181.

The pencil of light which is reflected by the light axis turning mirror 181 is collected by the collective lens 183 and is then shone on to the display device 51 at a predetermined angle by way of the condenser lens 195 by the light shining mirror 185. A heat sink 190 is provided on a side of the display device 51, taking the form of DMD, which faces the rear panel 13, whereby the display device 51 is cooled by this heat sink 190.

The pencil of light, which is light source light shone on to an image forming surface of the display device 51 by the light source-side optical system 170, is reflected by the image forming surface of the display device 51 and is then projected on to a screen by way of the projection-side optical system 220 as projected light. Here, the projection-side optical system 220 includes the condenser lens 195, the movable lens group 235, and a fixed lens group 225. The movable lens group 235 is allowed to move by the lens motor. Then, the movable lens group 235 and the fixed lens group 225 are incorporated in a fixed lens barrel. Thus, the fixed lens barrel including the movable lens group 235 is formed into a variable-focus lens which enables zooming and focusing controls.

In the projector 10 which is configured in the way described heretofore, when the optical wheel 101 is caused to rotate, and light is emitted at different timings from the excitation light shining device 70 and the red light source device 120, light in the red wavelength range, light in the green wavelength range, and light in the blue wavelength range are incident sequentially on the collective lens 173 and the light tunnel 175 by way of the light guiding optical system 140 and are then incident on the display device 51 by way of the light source-side optical system 170. Thus, in the projector 10, the display device 51, which is DMD, displays red, green and blue colors of light in time division according to the data, thereby making it possible to project a color image on to the screen.

Figure 3:
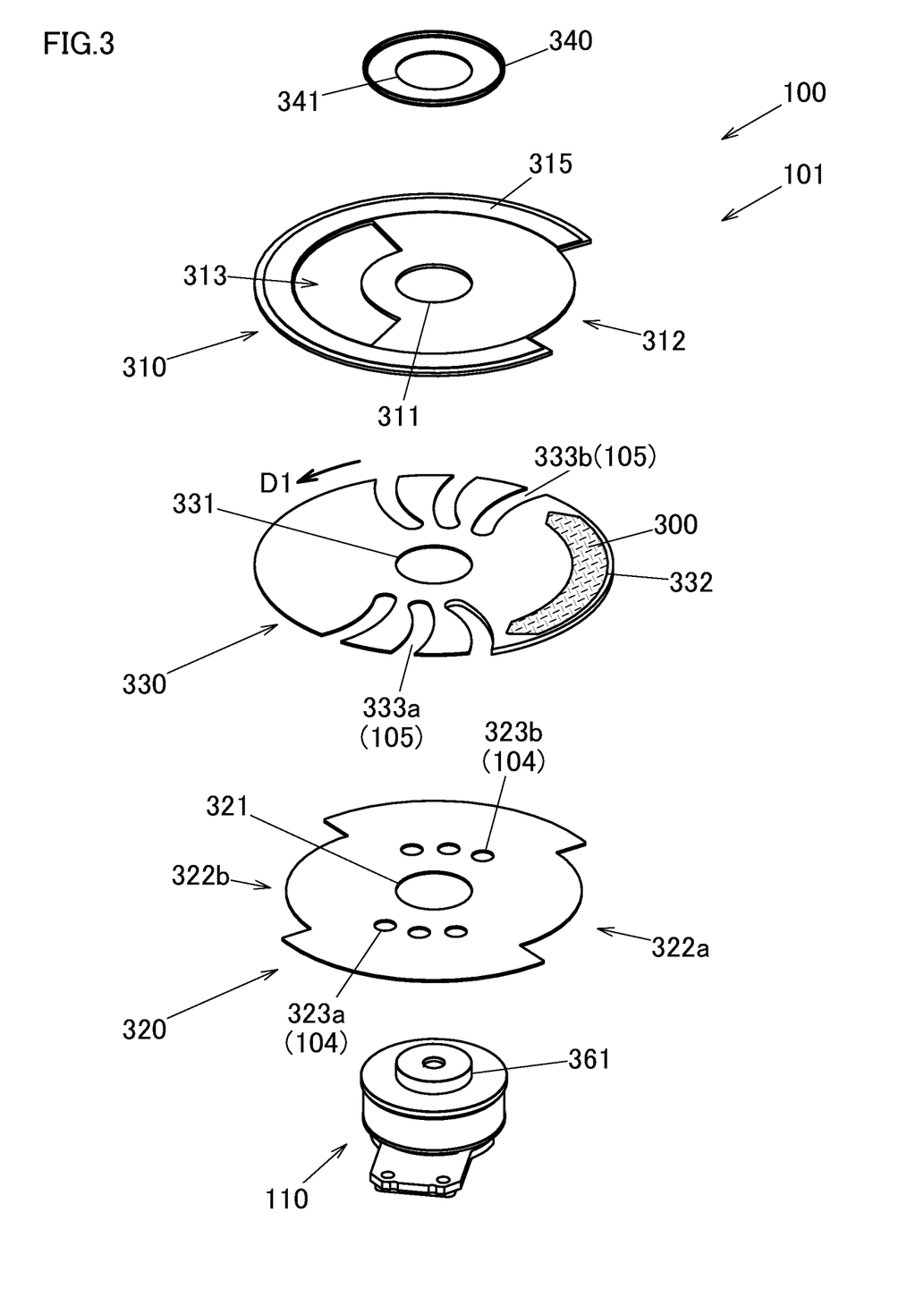
FIG. 3 is an exploded perspective view illustrating optical wheels and a motor of an optical wheel device according to the embodiment of the present invention.

Next, the optical wheel 101 of the optical wheel device 100 will be described in detail. FIG. 3 is a partially exploded perspective view of the optical wheel 101 of the optical wheel device 100. The optical wheel 101 includes a first wheel 310, a second wheel 320, a third wheel 330, and a balance wheel 340 and is formed substantially into a circular disc shape. A luminescent material layer 315 is disposed on one side (a front side) of the first wheel 310. The second wheel 320 is disposed on the other side (a rear side) of the first wheel 310, and the third wheel 330 is sandwiched between the first wheel 310 and the second wheel 320.

The third wheel 330 has a substantially circular disc shape. A mounting hole portion 331, which is a circular through hole, is formed at a center of the third wheel 330. This mounting hole portion 331 is mounted on a motor shaft 361 of the motor 110. An arc-shaped hole portion 332 is formed in an outer circumferential portion of the third wheel 330. A diffuse transmission member 300 is disposed in the hole portion 332. This diffuse transmission member 300 is made up of an arc-shaped transparent base member on a front surface of which fine irregularities, that is, recesses and protrusions are formed through sand blasting or the like. Both end portions of the diffuse transmission member 300 are held from a rear side and a front side thereof (the third wheel) by both end edge portions of a cut-out portion 322a in the second wheel 320 and both end edge portions of a cut-out portion 312 in the first wheel 310, these cut-out portions being described later, whereby the diffuse transmission member 300 is fixed to the third wheel 330. Three radial and arc-shaped cut-outs 333a and three radial and arc-shaped cut-outs 333b are formed in the third wheel 330 in such a manner as to be opposite to each other. These arc-shaped cut-outs 333a, 333b are each formed into a convex arc-like shape that protrudes convexly towards in a rotational direction D1 of the optical wheel 101. The arc-shaped cut-outs 333a, 333b are formed into the same shape while being opposite to each other, whereby a rotational balance of the third wheel 330 is ensured.

The second wheel 320 has a substantially circular disc shape, and a mounting hole portion 321, which is a circular through hole, is formed at a center of the second wheel 320. Similar to the mounting hole portion 331 of the third wheel 330, the mounting hole portion 321 of the second wheel 320 is mounted on the motor shaft 361. Two cut-out portions 322a, 322b are formed in an outer circumferential portion of the second wheel by cutting out partially the outer circumferential portion along an arc-like shape thereof in such a manner as to be opposite to each other. Additionally, three round holes 323a, which are round through holes, and three round holes 323b, which are round through holes, are formed near an outer circumferential side of the mounting hole portion 321. These round holes 323a, 323b constitute first opening portions 104, which will be described later. The cut-out portions 322a and the cut-out portions 322b are disposed 180 degrees apart from each other, and similarly, the round holes 323a and the round holes 323b are disposed 180 degrees apart from each other. Consequently, in the second wheel 320, too, the cut-out portions 322a and the cut-out portions 322b, and the round holes 323a and the round holes 323b are provided so as to be opposite to each other, whereby a rotational balance of the second wheel 320 is ensured.

The first wheel 310 has a substantially circular disc shape, and a mounting hole portion 311, which is a circular through hole, is formed at a center thereof. Similar to the mounting hole portion 331 of the third wheel 330 and the mounting hole portion 321 of the second wheel 320, the mounting hole portion 311 of the first wheel 310 is mounted on the motor shaft 361. A cut-out portion 312 is formed in an outer circumferential portion of the first wheel 310 by cutting out partially the outer circumferential portion along an arc-like shape thereof. Then, a luminescent material layer 315 is formed into a C-like annular shape in such a manner as to be aligned with the cut-out portion 312 in a circumferential direction. Additionally, an opening portion 313 is formed between the mounting hole portion 311 and the luminescent material layer 315 in a position situated opposite to the cut-out portion 312. A rotational balance of the first wheel 310 is ensured by the cut-out portion 312 and the opening portion 313.

The balance wheel 340 has a substantially circular disc shape, and a mounting hole portion 341, which is a circular through hole, is formed at a center thereof. The mounting hole portion 341 of the balance wheel 340, which is disposed on a front side of the first wheel 310 is fixed to the motor shaft 361. That is, the second wheel 320, the third wheel 330, the first wheel 310, and the balance wheel 340 are placed on one another sequentially in that order from the motor 110 side and are fixed to the motor shaft 361.

Figure 4A:
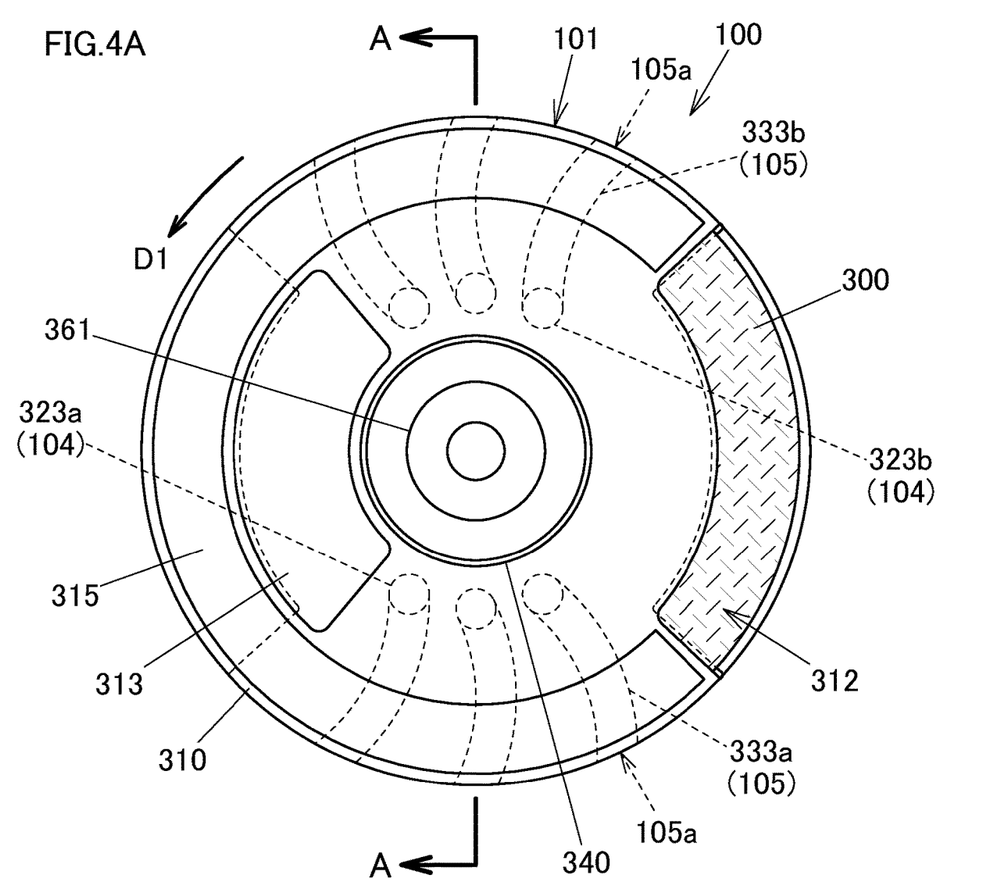
FIG. 4A is a front view, as viewed from an incident side of excitation light, of an optical wheel device according to the embodiment of the present invention, illustrating optical wheels and a motor of the optical wheel device.

As illustrated in FIG. 4A, in the optical wheel 101, the diffuse transmission member 300 is exposed from the cut-out portion 312 of the first wheel 310. Consequently, the luminescent material layer 315 and the diffuse transmission member 300 are provided to be aligned continuously in a circumferential direction. Here, the luminescent material layer 315 constitutes a luminescent light emitting area that receives light emitted from the excitation light shining device 70 in FIG. 2 as excitation light to emit light in the green wavelength range. Then, an area where the diffuse transmission member 300 is exposed from the cut-out portion 312 constitutes a diffuse transmission area that transmits light emitted from the excitation light shining device 70 while diffusing the light.

A base of the first wheel 310 is a metallic base formed of copper or aluminum, and a surface on a front side, which is a side facing the excitation light shining device 70, of the base is mirror finished. The luminescent material layer 315 made up of a green luminescent material is laid out on the mirror finished surface to form the luminescent light emitting area.

When light in the blue wavelength range is shone on to the luminescent material layer 315 as excitation light, the green luminescent material in the luminescent material layer 315 is excited, whereby light in the green wavelength range is emitted in every direction from the green luminescent material. A pencil of light emitted luminescently is emitted towards the rear panel 13 and is then incident on the collective lens group 111. On the other hand, light in the blue wavelength range emitted from the excitation light shining device 70 to be incident on the diffuse transmission area of the optical wheel 101 where incident light is transmitted or transmitted while being diffused is transmitted through the optical wheel 101 or transmitted therethrough while being diffused to be incident on the collective lens 115 disposed on a rear side (in other words, a side facing the front panel 12) of the optical wheel 101.

Figure 4B:
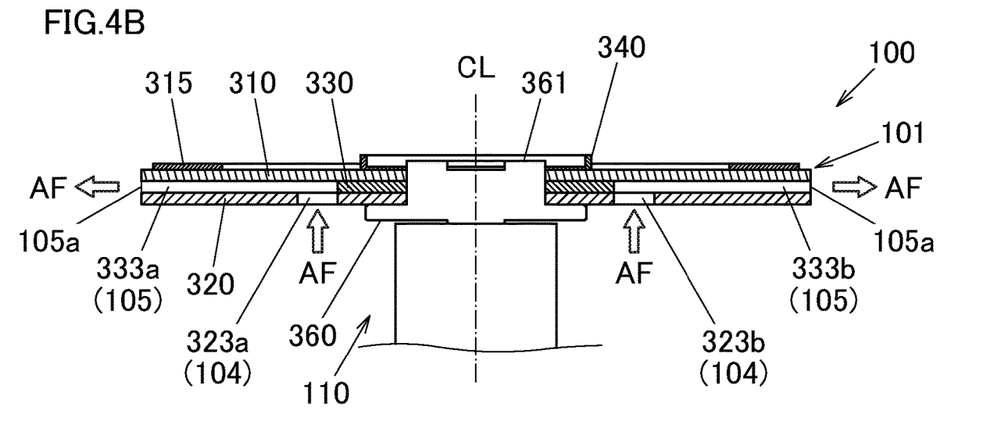
FIG. 4B is a sectional view of the optical wheel device according to the embodiment of the present invention taken along a line A-A in FIG. 4A, illustrating the optical wheels and the motor of the optical wheel device.

In the optical wheel 101, respective arc-shaped proximal end portions of the arc-shaped cut-outs 333a, 333b of the third wheel 330 coincide in position with the round holes 323a, 323b of the second of the second wheel 320, respectively. In this embodiment, a diameter of each of the round holes 323a, 323b and a width of each of the arc-shaped cut-outs 333a, 333b are substantially the same in dimension. Then, as illustrated in FIG. 4B, the arc-shaped cut-outs 333a, 333b define spaces referred to as communication passages 105 between the first wheel 310 and the second wheel 320. Then, end portions of the communication passages 105 are opened on an outer circumferential side of the third wheel 330 between the first wheel 310 and the second wheel 320 and constitute second opening portions 105a that are formed further radially outwards than the round holes 323a, 323b that constitute the first opening portions 104. In this way, the communication passages 105 includes the second opening portions 105a which are opened to the outside air to thereby establish a communication between the first opening portions 104 and the outside air.

The optical wheel 101 is rotated in the rotational direction D1 illustrated in FIG. 4A by the motor 110. Then, when the optical wheel 101 rotates, the first opening portions 104, the communication passages 105 and the second opening portions 105a, which communicate with one another, generate a negative pressure at the second opening portions 105a that are opened at an outermost circumference of the optical wheel 101. Then, as indicated by arrows AF in FIG. 4, there are generated air flows that flow in from the first opening portions 104, pass through the communication passages 105 and are then discharged from the second opening portions 105a. In this way, air flows are generated in the communication passages 105 defined between the first wheel 310 and the second wheel 320 in an interior of the optical wheel 101, whereby the first wheel 310 and the luminescent material layer 315 can be cooled. Further, the first opening portions 104 are formed near the motor 110, whereby the motor 110 is also cooled.

The communication passages 105 are formed by the arc-shaped cut-outs 333a, 333b that are formed into the convex arc-like shape protruding convexly in the rotational direction D1 at the portions where the second opening portions 105a are formed, and this configuration makes it difficult for air to be taken into the communication passages 105 even though the optical wheel 101 rotates, whereby inside air is discharged smoothly to the outside from the second opening portions 105a.

Next, first to seventh modified examples of the embodiment are illustrated in FIGS. 5A to 5D and 6E to 6G. In FIGS. 5A to 5D and 6E to 6G, only a half section of an optical wheel with respect to an axis center CL of a motor shaft 361 (an optical wheel 101) is illustrated.

First Modified Example

Figure 5A:
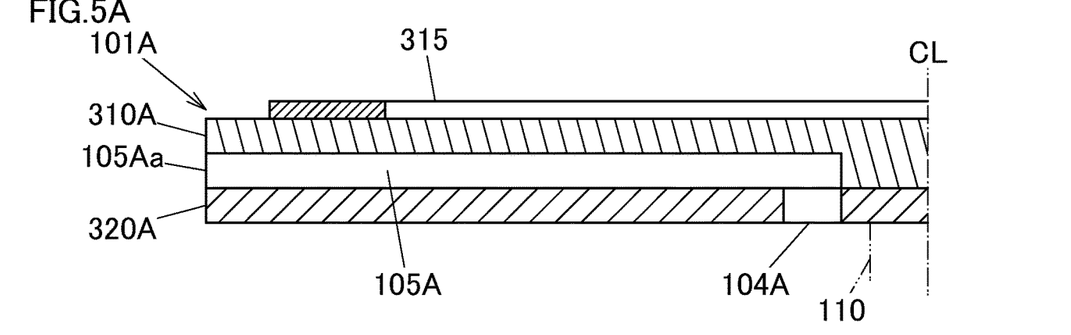
FIG. 5A is a schematic sectional view illustrating a first modified example of an optical wheel according to the embodiment of the present invention.

An optical wheel 101A according to a first modified example illustrated in FIG. 5A includes a first wheel 310A on one side of which a luminescent material layer 315 is laid out and a second wheel 320A disposed on the other side of the first wheel 310A. In this way, this configuration made up of the two wheels, that is, the first wheel 310A and the second wheel 320A can mainly be applied to a case where a luminescent material layer 315 has an annular shape (that is, the luminescent material layer 315 is formed along a full circumference of the first wheel 310A). (In this case, a different internal structure from one illustrated in FIG. 2 is adopted in which a blue semiconductor light emitting device is also provided separately from the excitation light shining device 70.) Then, first opening portions 104A are formed in the second wheel 302A, and second opening portions 105Aa of communication passages 105A are formed on a surface of an outer circumferential side of the optical wheel 101A (the first wheel 310A and the second wheel 320A). Here, the communication passages 105A are defined, for example, by forming radial slits on the other side of the first wheel 310A and combining the first wheel 310A having the radial slits formed thereon with the second wheel 320A.

Second Modified Example

Figure 5B:
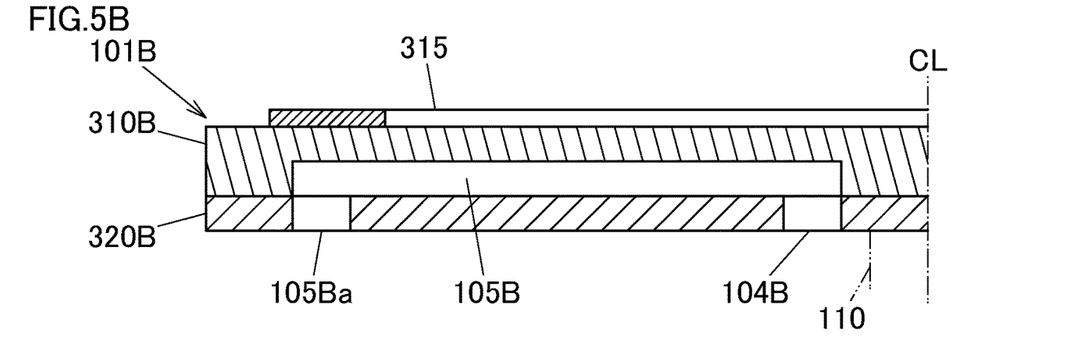
FIG. 5B is a schematic sectional view illustrating a second modified example of an optical wheel according to the embodiment of the present invention.

An optical wheel 101B according to a second modified example illustrated in FIG. 5B includes a first wheel 310B on one side of which a luminescent material layer 315 is laid out and a second wheel 320B disposed on the other side of the first wheel 310B. Then, first opening portions 104B and second opening portions 105a of communication passages 105B are formed on the second wheel 320B. The second opening portions 105Ba are formed further radially outwards than the first opening portions 104B.

Third Modified Example

Figure 5C:
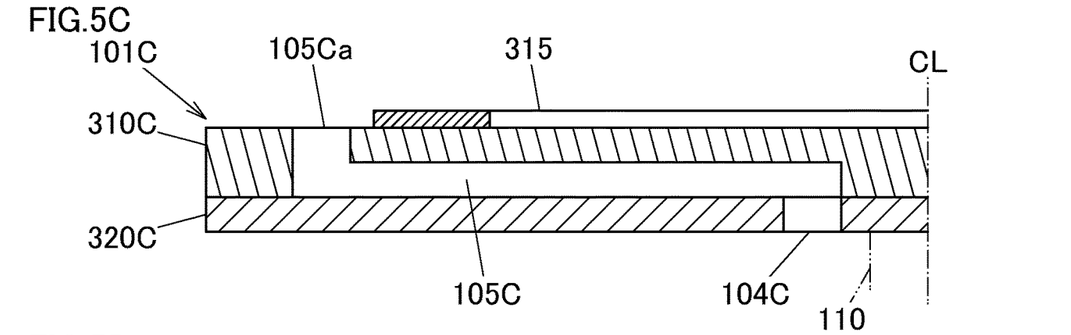
FIG. 5C is a schematic sectional view illustrating a third modified example of an optical wheel according to the embodiment of the present invention.

An optical wheel 101C according to a third modified example illustrated in FIG. 5C includes a first wheel 310C on one side of which a luminescent material layer 315 is laid out and a second wheel 320C disposed on the other side of the first wheel 310C. Then, first opening portions 104C are formed on the second wheel 320C, and second opening portions 105Ca of communication passages 105C are formed on the first wheel 310C. The second opening portions 105Ca are formed further radially outwards than the first opening portions 104C.

Fourth Modified Example

Figure 5D:
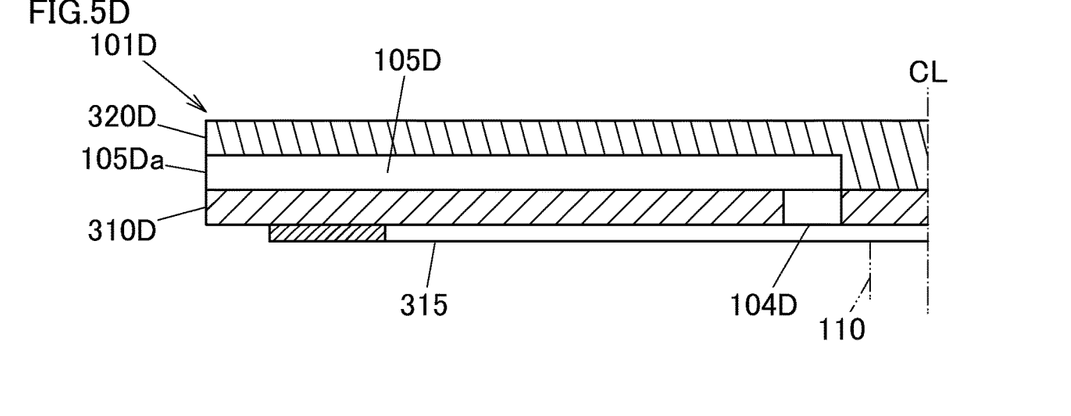
FIG. 5D is a schematic sectional view illustrating a fourth modified example of an optical wheel according to the embodiment of the present invention.

An optical wheel 101D according to a fourth modified example illustrated in FIG. 5D has a luminescent material layer 315 that is disposed on a side thereof that faces a motor 110. In this case, too, the luminescent material layer 315 is laid out on one side of the first wheel 310D, and a second wheel 320D is disposed on the other side of the first wheel 310D. Then, first opening portions 104D are caused to communicate with the outside air by way of communication passages 105D that individually include second opening portions 105Da. The second opening portions 105Da are formed further radially outwards than the first opening portions 104D.

Fifth Modified Example

Figure 6E:
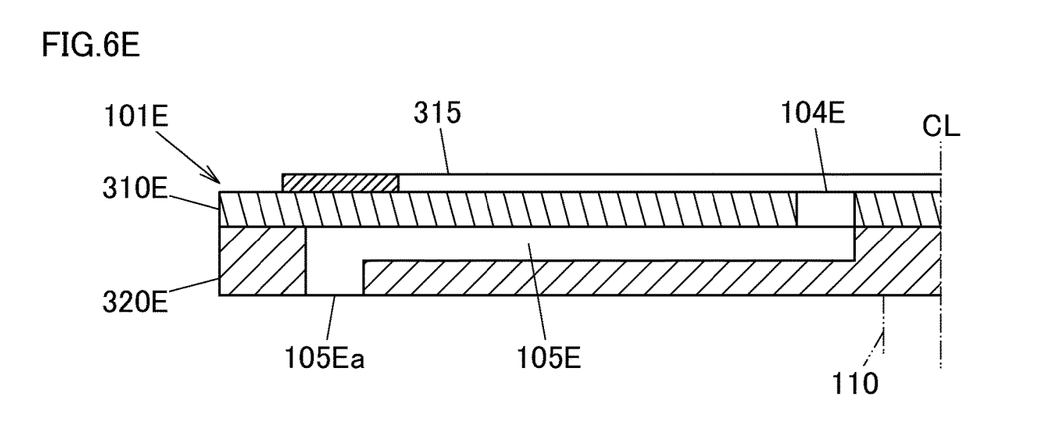
FIG. 6E is a schematic sectional view illustrating a fifth modified example of an optical wheel according to the embodiment of the present invention.

An optical wheel 101E according to a fifth modified example illustrated in FIG. 6E includes a first wheel 310E on one side of which a luminescent material layer 315 is laid out and a second wheel 320E disposed on the other side of the first wheel 310E. Then, first opening portions 104E are formed on the first wheel 310E, and second opening portions 105Ea of communication passages 105E are formed on the second wheel 320E. The second opening portions 105Ea are formed further radially outwards than the first opening portions 104E.

Sixth Modified Example

Figure 6F:
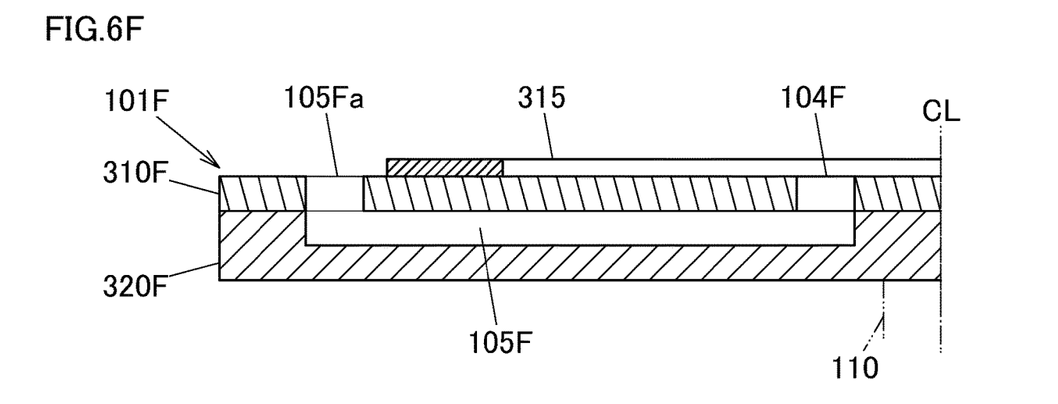
FIG. 6F is a schematic sectional view illustrating a sixth modified example of an optical wheel according to the embodiment of the present invention.

An optical wheel 101F according to a sixth modified example illustrated in FIG. 6F includes a first wheel 310F on one side of which a luminescent material layer 315 is laid out and a second wheel 320F disposed on the other side of the first wheel 310F. Then, first opening portions 104F are formed on the first wheel 310F, and second opening portions 105Fa of communication passages 105F are formed on the first wheel 310F. The second opening portions 105Fa are formed further radially outwards than the first opening portions 104F.

Seventh Modified Example

Figure 6G:
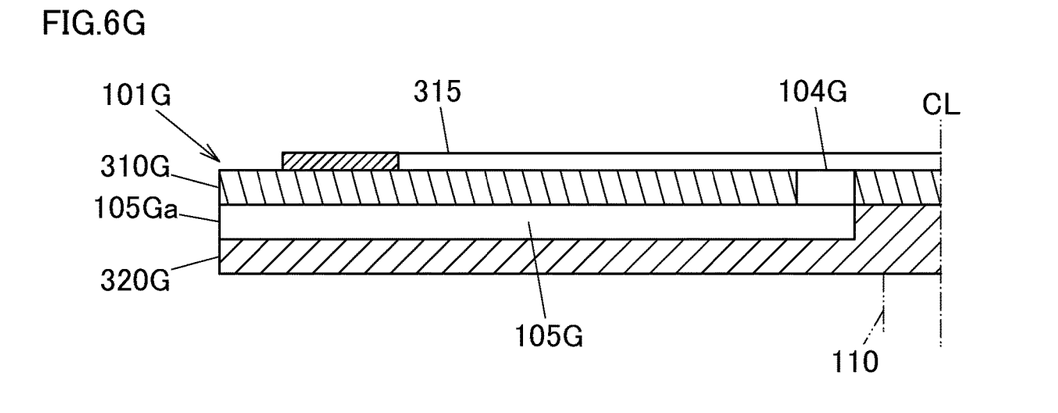
FIG. 6G is a schematic sectional view illustrating a seventh modified example of an optical wheel according to the embodiment of the present invention.

An optical wheel 101G according to a seventh modified example illustrated in FIG. 6G includes a first wheel 310G on one side of which a luminescent material layer 315 is laid out and a second wheel 320G disposed on the other side of the first wheel 310G. Then, first opening portions 104G are formed on the first wheel 310G, and second opening portions 105Ga of communication passages 105G are formed on a surface of an outer circumferential side of the optical wheel 101G (the first wheel 310G and the second wheel 320G). The second opening portions 105Ga are formed further radially outwards than the first opening portions 104G.

Thus, according to the embodiment of the present invention, the optical wheel 101, 101A to 101G of the optical wheel device 100 includes the first wheel 310, 310A to 310G on one side of which the luminescent material layer 315 is laid out, the second wheel 320, 320A to 320G disposed on the other side of the first wheel 310, 310A to 310G, the first opening portions 104, 104A to 104G which are provided on the first wheel 310, 310A to 310G or the second wheel 320, 320A to 320G and are disposed near the center of rotation, the second opening portions 105a, 105Aa to 105Ga that are provided further radially outwards than the first opening portions 104, 104A to 104G, and the passages 105, 105A to 105G defined between the first wheel 310, 310A to 310G and the second wheel 320, 320A to 320G to establish communications between the first opening portions 104, 104A to 104G and the second opening portions 105a, 105Aa to 105Ga.

As a result, in the communication passages 105, 105A to 105G in the interior of the optical wheel 101, 101A to 101G on which the luminescent material layer 315 is disposed, air is caused to flow from the first opening portions 104, 104A to 104G to the communication passages 105, 105A to 105G as the optical wheel 101, 101A to 101G rotates, whereby the luminescent material layer 315 can be cooled effectively.

In addition, the second opening portions 105a, 105Aa, 105Da, 105Ga are formed on the surface of the outer circumferential side between the first wheel 310, 310A, 310D, 310G and the second wheel 320, 320A, 320D, 320G. As a result, the second opening portions 105a, 105Aa, 105Da, 105Ga are opened in a centrifugal direction of the optical wheel 101, 101A, 101D, 101G, the negative pressures at the second opening portions 105a, 105Aa, 105Da, 105Ga are increased, whereby an amount of air can be increased which flows in from the first opening portions 104, 104A, 104D, 104G, passes through the communication passages 105, 105A, 105D, 105G and is discharged from the second opening portions 105a, 105Aa, 105Da, 105Ga to the outside.

The second opening portions 105Ba, 105Ca, 105Ea, 105Fa are formed on the first wheel 310B, 310C, 310E, 310F or the second wheel 320B, 320C, 320E, 320F. As a result, the size of the second opening portions 105Ba, 105Ca, 105Ea, 105Fa can easily be made the same as, for example, the size of the first opening portions 104B, 104C, 104E, 104F, whereby air can be caused to flow with good efficiency.

The multiple first opening portions 104, 104A to 104G are provided, and the communications passages 105, 105A to 105G are formed to correspond individually to the first opening portions 104, 104A to 104G. As a result, the amount of air that flows through the interior of the optical wheel 101, 101A to 101G can be increased, whereby the luminescent material layer 315 can be cooled more effectively.

The communication passages 105 are each formed into the arc-like shape. As a result, air that would otherwise be taken in from the second opening portions 105*a* that are formed at the end portions of the communication passages 105 can be reduced, whereby negative pressures can be generated at the second opening portions 105*a* with good efficiency.

The first opening portions 104, 104A to 104D are provided near the motor 110. As a result, the first opening portions 104, 104A to 104D are disposed closer to the motor 110, and therefore, air flowing from the first opening portions 104, 104A to 104D to the communication passages 105, 105A to 105D can also contribute to cooling of the motor 110.

In addition, the first opening portions 104 and the communication passages 105 can also be formed on the optical wheel 101 of the three wheel structure in which the diffuse transmission member 300 is disposed on the third wheel 330 and the diffuse transmission member 300 is held by the first wheel 310 and the second wheel 320 therebetween.

In the optical wheel 101 of the three wheel structure, too, the luminescent material layer 315 may be formed into an annular shape (may be formed to extend along a full circumference of the optical wheel 101).

The projector 10 includes the light source unit 60 including the optical wheel device 100. As a result, it is possible to provide the light source unit 60 and the projector 10 in which the cooling effect of the luminescent material layer 315 is increased to the high level.

While the embodiment of the present invention has been described heretofore, the embodiment including the modified examples is presented as an example, and hence, there is no intention to limit the scope of the present invention by the embodiment. This novel embodiment can be carried out in other various forms, and various omissions, replacements and modifications can be made to the embodiment without departing from the spirit and scope of the invention. Those resulting embodiments and their modifications are included in the spirit and scope of the present invention and are also included in the scope of inventions claimed for patent under claims below and their equivalents.

What is claimed is:

1. An optical wheel device comprising:
   a first wheel having a luminescent material layer disposed on one side thereof;
   a second wheel disposed on the other side of the first wheel;
   a first opening portion provided on the first wheel or the second wheel to be situated near a center of rotation;
   a second opening portion provided further radially outwards than the first opening portion;
   a communication passage formed between the first wheel and the second wheel to establish a communicated between the first opening portion and the second opening portion;
   a motor configured to rotationally drive the first wheel and the second wheel; and
   a drive control device configured to control driving of the motor.

2. The optical wheel device according to claim 1,
   wherein the second opening portion is formed on a surface of an outer circumferential side between the first wheel and the second wheel.

3. The optical wheel device according to claim 1,
   wherein the second opening portion is formed on the first wheel or the second wheel.

4. The optical wheel device according to claim 1,
   wherein a plurality of the first opening portions and a plurality of the second opening portions are provided to correspond to each other, and a plurality of the communication passages are formed to correspond to the first opening portions and the second opening portions.

5. The optical wheel device according to claim 2,
   wherein a plurality of the first opening portions and a plurality of the second opening portions are provided to correspond to each other, and a plurality of the communication passages are formed to correspond to the first opening portions and the second opening portions.

6. The optical wheel device according to claim 3,
   wherein a plurality of the first opening portions and a plurality of the second opening portions are provided to correspond to each other, and a plurality of the communication passages are formed to correspond to the first opening portions and the second opening portions.

7. The optical wheel device according to claim 1,
   wherein the communication passage is formed into an arc-like shape.

8. The optical wheel device according to claim 2,
   wherein the communication passage is formed into an arc-like shape.

9. The optical wheel device according to claim 3,
   wherein the communication passage is formed into an arc-like shape.

10. The optical wheel device according to claim 4,
    wherein the communication passage is formed into an arc-like shape.

11. The optical wheel device according to claim 5,
    wherein the communication passage is formed into an arc-like shape.

12. The optical wheel device according to claim 6,
    wherein the communication passage is formed into an arc-like shape.

13. The optical wheel device according to claim 1,
    wherein the first opening portion is provided near the motor.

14. The optical wheel device according to claim 2,
    wherein the first opening portion is provided near the motor.

15. The optical wheel device according to claim 3,
    wherein the first opening portion is provided near the motor.

16. The optical wheel device according to claim 4,
    wherein the first opening portion is provided near the motor.

17. The optical wheel device according to claim 5,
    wherein the first opening portion is provided near the motor.

18. The optical wheel device according to claim 6,
    wherein the first opening portion is provided near the motor.

19. A light source unit comprising:
    the optical wheel device according to claim 1; and
    an excitation light shining device comprising a semiconductor light emitting element configured to excite the luminescent material layer.

20. A projector comprising:
the light source unit according to claim 19;
a display device on to which light source light is shone from the light source unit to form image light;
a projection-side optical system configured to project the image light emitted from the display device on to a screen; and
a projector control unit configured to control the display device and the light source unit.

\* \* \* \* \*